US012593100B2

(12) United States Patent
Ishii et al.

(10) Patent No.: US 12,593,100 B2
(45) Date of Patent: Mar. 31, 2026

(54) NOTIFICATION SYSTEM, NOTIFICATION METHOD, CONTROL DEVICE, AND RECORDING MEDIUM

(71) Applicant: Panasonic Intellectual Property Management Co., Ltd., Osaka (JP)

(72) Inventors: Masahiro Ishii, Hyogo (JP); Hiromu Ikeuchi, Hyogo (JP); Sara Asai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/699,144

(22) PCT Filed: Sep. 25, 2023

(86) PCT No.: PCT/JP2023/034743
§ 371 (c)(1),
(2) Date: Apr. 5, 2024

(87) PCT Pub. No.: WO2025/069140
PCT Pub. Date: Apr. 3, 2025

(65) Prior Publication Data
US 2025/0240482 A1 Jul. 24, 2025

(51) Int. Cl.
*H04N 21/442* (2011.01)
*G06V 20/52* (2022.01)
*H04N 21/422* (2011.01)

(52) U.S. Cl.
CPC ....... *H04N 21/44218* (2013.01); *G06V 20/52* (2022.01); *H04N 21/42203* (2013.01)

(58) Field of Classification Search
CPC ....... H04N 21/44218; H04N 21/42203; G06V 20/52
See application file for complete search history.

(56) References Cited

U.S. PATENT DOCUMENTS 10,531,157 B1 * 1/2020 Loritsch ............. H04N 21/4524
10,904,615 B2 * 1/2021 Boss .................. H04N 21/4112
(Continued)

FOREIGN PATENT DOCUMENTS

JP 2008-217731 A 9/2008
JP 2011-043894 A 3/2011
JP 2019-216474 A 12/2019

OTHER PUBLICATIONS

International Search Report dated Oct. 31, 2023 issued in International Patent Application No. PCT/JP2023/034743.

*Primary Examiner* — An Son P Huynh
(74) *Attorney, Agent, or Firm* — Rimon P.C.

(57) ABSTRACT
A notification system includes: an obtainer that obtains an audio content to be notified of and a result of sensing by a sensor that senses a space in which a notification device is located; a determiner that determines whether a first user ready to listen to the audio content notified of by the notification device is in the space, based on the result of the sensing; and a controller that performs first control of controlling notification of the audio content by the notification device depending on whether the first user is in the space. In the first control, the controller: causes the notification device to notify of the audio content, when the first user is in the space; and prevents the notification device from notifying of the audio content, when the first user is not in the space.

5 Claims, 4 Drawing Sheets

(56) References Cited

U.S. PATENT DOCUMENTS

| | | | | |
|---|---|---|---|---|
| 11,688,414 | B1 * | 6/2023 | Onofrio | G08B 13/1672 |
| | | | | 367/128 |
| 2010/0040240 | A1 * | 2/2010 | Bonanno | H04R 5/033 |
| | | | | 381/74 |
| 2010/0141469 | A1 * | 6/2010 | Son | G05B 19/042 |
| | | | | 709/223 |
| 2010/0150378 | A1 * | 6/2010 | Lee | H03G 7/004 |
| | | | | 381/104 |
| 2011/0069940 | A1 * | 3/2011 | Shimy | H04N 21/42201 |
| | | | | 386/296 |
| 2013/0036200 | A1 * | 2/2013 | Roberts | H04L 65/1093 |
| | | | | 709/219 |
| 2013/0173765 | A1 * | 7/2013 | Korbecki | H04N 21/42209 |
| | | | | 709/221 |
| 2014/0068692 | A1 * | 3/2014 | Archibong | H04N 21/4334 |
| | | | | 725/116 |
| 2014/0122737 | A1 * | 5/2014 | Silberstein | G06F 16/487 |
| | | | | 709/231 |
| 2014/0181855 | A1 * | 6/2014 | Fife | H04N 21/6543 |
| | | | | 725/25 |
| 2014/0250447 | A1 * | 9/2014 | Schink | H04N 21/478 |
| | | | | 725/10 |
| 2015/0033266 | A1 * | 1/2015 | Klappert | H04N 21/4314 |
| | | | | 725/52 |
| 2015/0120304 | A1 * | 4/2015 | Yamashita | G10L 15/22 |
| | | | | 704/270.1 |
| 2015/0135238 | A1 * | 5/2015 | Wickenkamp | H04N 21/4122 |
| | | | | 725/80 |
| 2015/0143409 | A1 * | 5/2015 | Maughan | H04N 21/44213 |
| | | | | 725/34 |
| 2015/0178511 | A1 * | 6/2015 | Klappert | G06F 21/6245 |
| | | | | 726/27 |
| 2015/0245081 | A1 * | 8/2015 | Cook | H04N 21/41407 |
| | | | | 725/81 |
| 2015/0319400 | A1 * | 11/2015 | Golyshko | H04N 21/812 |
| | | | | 386/230 |
| 2016/0307413 | A1 | 10/2016 | Rafii et al. | |
| 2016/0311323 | A1 * | 10/2016 | Lee | B60K 35/10 |
| 2017/0019744 | A1 * | 1/2017 | Matsumoto | G06V 10/147 |
| 2017/0193982 | A1 * | 7/2017 | Agrawal | G06V 40/20 |
| 2017/0339458 | A1 * | 11/2017 | Patel | H04L 67/535 |
| 2019/0261027 | A1 * | 8/2019 | Hawke | H04N 21/23424 |
| 2019/0362557 | A1 * | 11/2019 | Lacey | G06T 5/20 |
| 2021/0136448 | A1 * | 5/2021 | Ramirez | H04H 60/33 |
| 2022/0066733 | A1 * | 3/2022 | Tsuruga | H04R 3/00 |
| 2022/0337780 | A1 * | 10/2022 | Huang | G06F 3/011 |
| 2023/0019723 | A1 * | 1/2023 | Adams Ryan | H04N 21/4755 |
| 2023/0030257 | A1 * | 2/2023 | Konno | G10K 15/02 |

* cited by examiner

NOTIFICATION SYSTEM, NOTIFICATION METHOD, CONTROL DEVICE, AND RECORDING MEDIUM

CROSS-REFERENCE OF RELATED APPLICATIONS

This application is the U.S. National Phase under 35 U.S.C. § 371 of International Patent Application No. PCT/JP2023/034743, filed on Sep. 25, 2023, the entire disclosure of which application is incorporated by reference herein.

TECHNICAL FIELD

The present disclosure relates to a notification system, a notification method, a control device, and a recording medium.

BACKGROUND ART

Patent Literature (PTL) 1 discloses an electronic device that outputs audio guidance according to the preference of the user.

CITATION LIST

Patent Literature

[PTL 1] Japanese Unexamined Patent Application Publication No. 2011-43894

SUMMARY OF INVENTION

Technical Problem

The present disclosure provides a notification system, and so on, capable of effectively notifying the user of an audio content.

Solution to Problem

A notification system according to an aspect of the present disclosure includes: an obtainer that obtains an audio content to be notified of and a result of sensing by a sensor that senses a space in which a notification device is located; and a controller that performs first control of controlling notification of the audio content by the notification device depending on whether a first user ready to listen to the audio content notified of by the notification device is in the space, based on the result of the sensing. In the first control, the controller: causes the notification device to notify of the audio content, when the first user is in the space; and prevents the notification device from notifying of the audio content, when the first user is not in the space.

A notification method according to an aspect of the present disclosure includes: obtaining an audio content to be notified of and a result of sensing by a sensor that senses a space in which a notification device is located; determining whether to notify of the audio content depending on whether a first user ready to listen to the audio content notified of by the notification device is in the space, based on the result of the sensing; and notifying of the audio content based on a result of the determining. The determining includes: determining to notify of the audio content, when the first user is in the space; and determining not to notify of the audio content, when the first user is not in the space.

A control device according to an aspect of the present disclosure is communicably connected to a notification device. The control device includes: an obtainer that obtains an audio content to be notified of and a result of sensing by a sensor that senses a space in which a notification device is located; and a controller that performs first control of controlling notification of the audio content by the notification device depending on whether a first user ready to listen to the audio content notified of by the notification device is in the space, based on the result of the sensing. In the first control, the controller: causes the notification device to notify of the audio content, when the first user is in the space; and prevents the notification device from notifying of the audio content, when the first user is not in the space.

Note that these general and specific aspects of the present disclosure may be implemented using a device, an integrated circuit, a computer program, or a non-transitory computer-readable recording medium such as a CD-ROM, or any combination of devices, methods, systems, integrated circuits, computer programs, or non-transitory computer-readable recording media.

Advantageous Effects of Invention

The notification system, and so on, according to the present disclosure effectively notifies the user of an audio content.

DESCRIPTION OF EMBODIMENT

Figure 1:
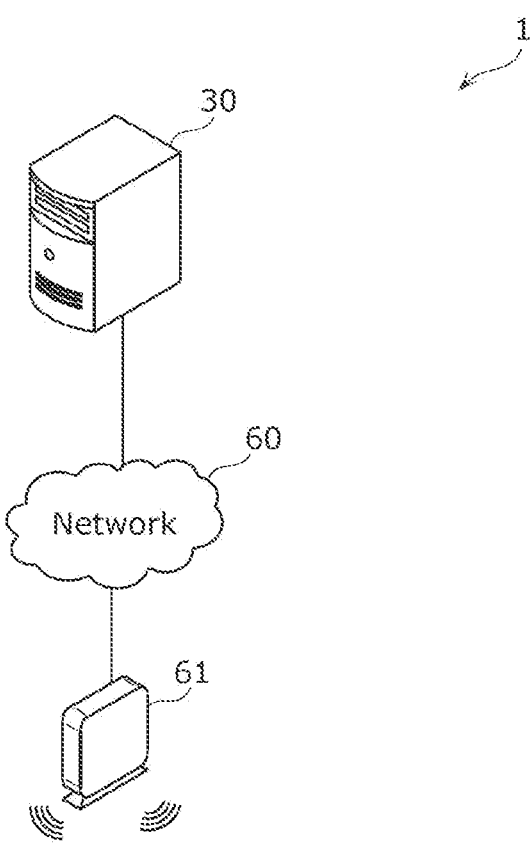
FIG. 1 is for illustrating an outline of a notification system according to an embodiment.
Figure 1:
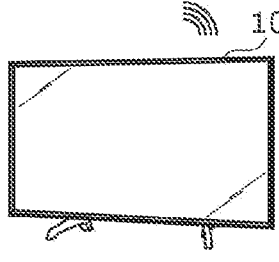
Figure 1:
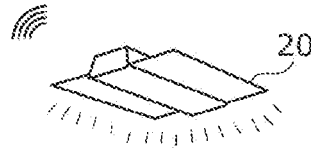

Underlying Knowledge Forming Basis of the Present Disclosure

The background art describes a sound output control method of controlling the timing of sound output in accordance with the times of display on a display screen and the presence or absence of the user operation, in an electronic device that outputs audio guidance, when displaying the display screen on a display means. In this manner, an electronic device (i.e., a notification device) makes a notification to the user by outputting the audio guidance (i.e., emitting a sound). However, when there is a loud noise around the user, or the user is engaged in another activity such as viewing a content, the user has difficulty in recognizing the notification by the sound.

After intensive studies, the inventors have conceived of a notification system that effectively makes a notification to the user by emitting a sound at a timing when the user easily recognizes the notification by the sound.

A notification system according to a first aspect of the present disclosure includes: an obtainer that obtains an audio content to be notified of and a result of sensing by a sensor that senses a space in which a notification device is located; and a controller that performs first control of controlling notification of the audio content by the notification device depending on whether a first user ready to listen to the audio content notified of by the notification device is in the space, based on the result of the sensing. In the first control, the controller: causes the notification device to notify of the audio content, when the first user is in the space; and prevents the notification device from notifying of the audio content, when the first user is not in the space.

With this configuration, if the first user ready to listen to an audio content is in the space in which the notification device is located, an audio content is notified of and is thus easily recognized by the first user. Accordingly, the first user easily recognizes the notification of the audio content. On the other hand, if the first user ready to listen to an audio content is not in the space in which the notification device is located, no audio content is notified of. This reduces the notification of an audio content less likely to be recognized and eventually reduces the power consumption.

A notification system according to a second aspect of the present disclosure is the notification system according to the first aspect. The sensor is a microphone that detects a sound generated in the space. The controller determines that: the first user is in the space, when determining that a sound pressure of the sound generated in the space is lower than or equal to a predetermined threshold, based on a sound signal generated by the microphone; and the first user is not in the space, when determining that the sound pressure of the sound generated in the space is higher than the predetermined threshold, based on the sound signal.

With this configuration, if the sound pressure of the sound generated in the space in which the notification device is located is lower than or equal to a predetermined threshold, an audio content is notified of and is thus easily recognized by the first user. Accordingly, the user can be effectively notified of an audio content. On the other hand, if the sound pressure of the sound generated in the space in which the notification device is located is higher than the predetermined threshold, no audio content is notified of. This reduces the notification of an audio content less likely to be recognized and eventually reduces the power consumption.

A notification system according to a third aspect of the present disclosure is the notification system according to the first aspect. The sensor is a camera that captures the space or a motion sensor that includes the space within a detection range. The controller determines that: the first user is in the space, when determining that a person is in the space, based on one or more images captured by the camera or a result of detection by the motion sensor; and the first user is not in the space, when determining that no one is in the space, based on the one or more images or the result of the detection.

With this configuration, if the first user is in the space, an audio content is notified of and is thus easily recognized by the first user. Accordingly, the user can be effectively notified of an audio content. On the other hand, if the first user is not in the space, no audio content is notified of. This reduces the notification of an audio content less likely to be recognized and eventually reduces the power consumption.

A notification system according to a fourth aspect of the present disclosure is the notification system according to the first aspect. The sensor includes at least one of a microphone that detects a sound generated in the space or a camera that captures the space. The controller determines that: the first user is in the space, when determining that a person in the space performs a predetermined behavior, based on at least one of a sound signal generated by the microphone or one or more images captured by the camera; and the first user is in the space, when determining that a person in the space does not perform the predetermined behavior, based on at least one of the sound signal or the one or more images.

With this configuration, if the person in the space in which the notification device is located does not perform a predetermined behavior, an audio content is notified of and is thus easily recognized by the first user. Accordingly, the user can be effectively notified of an audio content. On the other hand, if the person in the space in which the notification device is located perform the predetermined behavior, no audio content is notified of. This reduces the notification of an audio content less likely to be recognized and eventually reduces the power consumption.

A notification system according to a fifth aspect of the present disclosure is the notification system according to any one of first to fourth aspects. The obtainer obtains a plurality of audio contents at a plurality of timings that are different from each other. The controller: determines whether the first user is in the space, based on a result of sensing by the sensor at each of the plurality of timings; and causes the notification device to notify of a first audio content that has not been notified of at timing of determining that the first user is not in the space, when determining that the first user is in the space after determining that the first user is not in the space, based on a result of sensing at first timing at which the first audio content is obtained.

Accordingly, the first audio content, which could not have been notified of, is notified of when it becomes ready. This reduces the failure of the user in recognizing the first audio content.

A notification system according to a sixth aspect of the present disclosure is the notification system according to any one of first to fifth aspects. The obtainer further obtains priority information on priority of the audio content. The controller performs: second control of causing the notification device to notify of the audio content, when the priority is a first rank; and the first control, when the priority is a second rank that is lower than the first rank.

Accordingly, the user can be immediately notified of an audio content with a higher priority.

A notification method according to a seventh aspect of the present disclosure includes: obtaining an audio content to be notified of and a result of sensing by a sensor that senses a space in which a notification device is located; determining whether to notify of the audio content depending on whether a first user ready to listen to the audio content notified of by the notification device is in the space, based on the result of the sensing; and notifying of the audio content based on a result of the determining. The determining includes: determining to notify of the audio content, when the first user is in the space; and determining not to notify of the audio content, when the first user is not in the space.

With this configuration, if the first user ready to listen to an audio content is in the space in which the notification device is located, an audio content is notified of and is thus easily recognized by the first user. Accordingly, the first user easily recognizes the notification of the audio content. On the other hand, if the first user ready to listen to an audio content is not in the space in which the notification device is located, no audio content is notified of. This reduces the notification of an audio content less likely to be recognized and eventually reduces the power consumption.

A control device according to an eighth aspect of the present disclosure is communicably connected to a notification device. The control device includes: an obtainer that obtains an audio content to be notified of and a result of sensing by a sensor that senses a space in which a notification device is located; and a controller that performs first control of controlling notification of the audio content by the notification device depending on whether a first user ready to listen to the audio content notified of by the notification device is in the space, based on the result of the sensing. In the first control, the controller: causes the notification device to notify of the audio content, when the first user is in the space; and prevents the notification device from notifying of the audio content, when the first user is not in the space.

With this configuration, if the first user ready to listen to an audio content is in the space in which the notification device is located, an audio content is notified of and is thus easily recognized by the first user. Accordingly, the first user easily recognizes the notification of the audio content. On the other hand, if the first user ready to listen to an audio content is not in the space in which the notification device is located, no audio content is notified of. This reduces the notification of an audio content less likely to be recognized and eventually reduces the power consumption.

A recording medium according a ninth aspect of the present disclosure is a non-transitory computer-readable recording medium having recorded thereon a program for causing a computer to execute the notification method according to the seventh aspect.

Note that these general and specific aspects of the present disclosure may be implemented using a device, an integrated circuit, a computer program, or a non-transitory computer-readable recording medium such as a CD-ROM, or any combination of devices, methods, systems, integrated circuits, computer programs, or non-transitory computer-readable recording media.

Now, an embodiment will be described in detail with reference to the drawing as appropriate. Unnecessarily detailed description may be however omitted. For example, detailed description of already well-known matters and duplicated description of substantially the same configurations may be omitted. This is for avoiding unnecessarily redundant description and for easier understanding by those skilled in the art.

Note that the inventors provide the appended drawings and the following description for sufficient understanding of the present disclosure by those skilled in the art and do not intend to limit the subject matters of the claims by the appended drawings and the following description.

EMBODIMENT

1. Configuration

FIG. 1 is for illustrating an outline of a notification system according to an embodiment.

Specifically, FIG. 1 shows notification devices 10 and 20, server 30, network 60, and router 61. Among these components, notification system 1 includes notification devices 10 and 20 and server 30, for example. Notification devices 10 and 20 and server 30 are communicably connected to each other via network 60. Router 61 is a device that relays the communicative connection of notification devices 10 and 20 to network 60.

Notification system 1 notifies the user of a predetermined content as follows. Server 30 transmits a notification instruction to notification devices 10 and 20. Notification devices 10 and 20 then output a sound according to the received notification instruction. For example, server 30 transmits the notification instruction to notification devices 10 and 20 in the form of a push notification. The notification instruction includes at least one of a sound indicating the notification item (i.e., an audio content) or a character string and an image indicating the notification item (i.e., a visual content).

Note that the notification instruction may include an audio content but no visual content.

Alternatively, notification devices 10 and 20 may store a plurality of notification items in advance. The notification instruction may be for instructing notification devices 10 and 20 to reproduce a sound indicating one of the notification items stored in notification devices 10 and 20. That is, the notification instruction may include information designating the notification item to be reproduced among the notification items. The notification items in this case may include an audio content and a visual content, or may include an audio content but no visual content.

Figure 2:
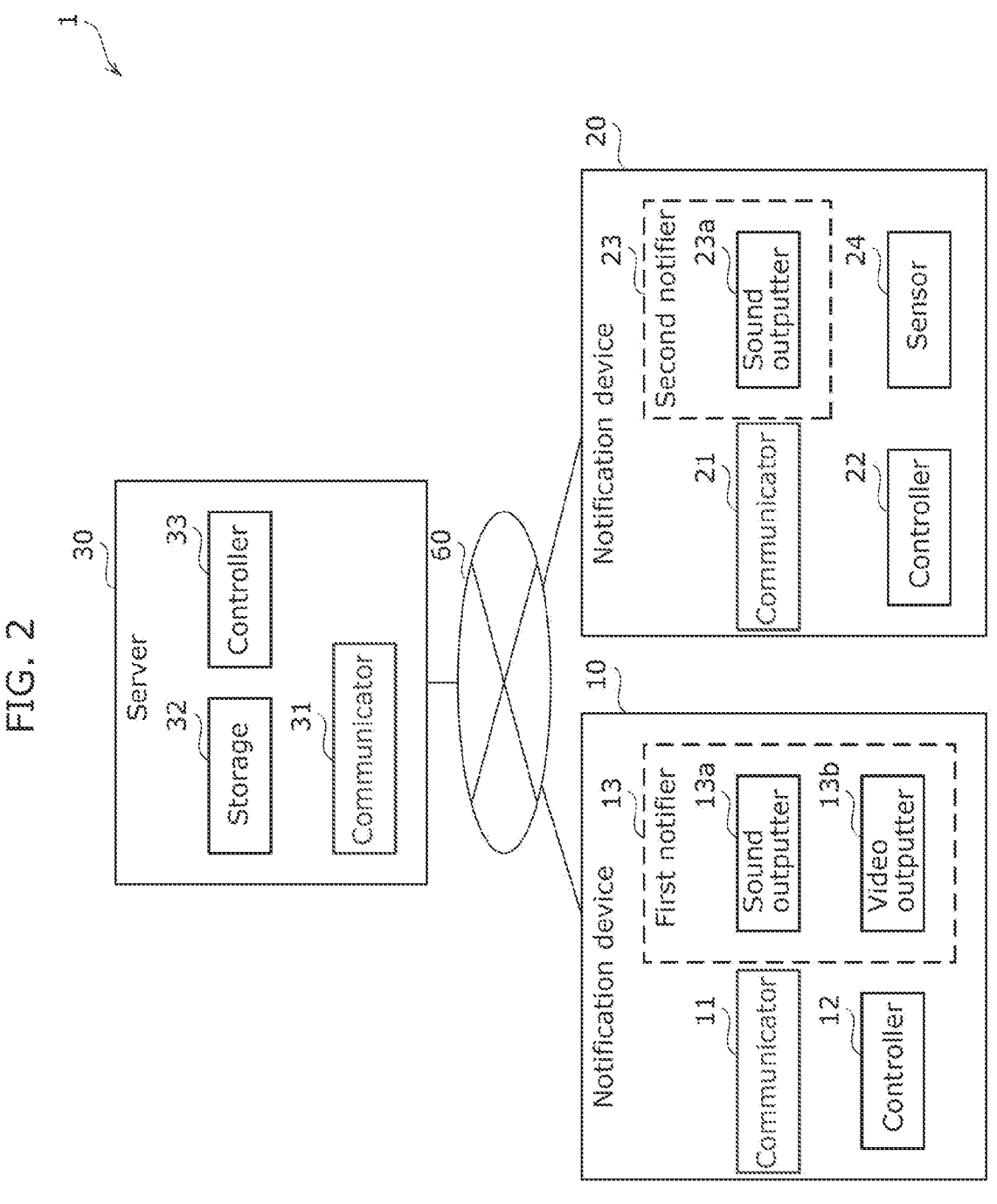
FIG. 2 shows an example configuration of the notification system according to the embodiment.

FIG. 2 shows an example configuration of the notification system according to the embodiment.

Notification system 1 includes notification devices 10 and 20, and server 30. FIG. 2 shows no router 61. Notification devices 10 and 20 are, for example, owned by the same user. For example, server 30 stores the respective device information on notification devices 10 and 20 in association with the identifier of the same user. Notification devices 10 and 20 are located in the same space. For example, notification devices 10 and 20 are located in a predetermined space and notify the user in the predetermined space of an audio content. In other words, by notifying of the audio content, notification devices 10 and 20 allows the user in the predetermined space to recognize the audio content.

Notification device 10 includes communicator 11, controller 12, and first notifier 13. Notification device 10 can output a sound and a video, for example. Notification device 10 is a TV, for example. Notification device 10 may include a speaker for outputting a sound, and a display for outputting a video. Note that notification device 10 may be any home appliance as long as including a speaker and a display.

Notification device 10 does not necessarily include any speaker or display, and only needs to output a sound signal to a speaker and a video signal to a display. For example, notification device 10 may be a recorder or a set top box, for example.

Communicator 11 receives a notification instruction from server 30 via network 60. Communicator 11 may be a communication interface (IF), for example. Communicator 11 may be a wired or wireless communication interface. Communicator 11 is connected to network 60 not necessarily via router 61 but may be connected to network 60 via a communication line, such as a mobile phone communication network.

Once communicator 11 receives a notification instruction, controller 12 causes first notifier 13 to notify of a content according to the notification instruction. If the notification instruction includes an audio content, controller 12 causes first notifier 13 to notify of the audio content by a sound. If the notification instruction includes an audio content and a visual content, controller 12 causes first notifier 13 to notify of the audio content by a sound and the visual content by display.

If the notification instruction includes an instruction to reproduce a jingle, controller 12 may cause first notifier 13 to output a jingle. If the notification instruction includes an audio content and an instruction to reproduce a jingle, controller 12 may cause first notifier 13 to output a jingle and then to notify of the audio content by a sound. Controller 12 may be a control circuit, such as a processor.

First notifier 13 makes a notification under the control by controller 12. First notifier 13 includes sound outputter 13a and video outputter 13b. Once controller 12 executes the notification of an audio content, sound outputter 13a reproduces the audio content and outputs a sound or a sound signal according to the audio content. Sound outputter 13a may be a speaker, or may include a sound signal processing circuit and an output terminal for outputting a sound signal to a speaker. Once controller 12 executes the notification of a visual content, video outputter 13b reproduces the visual content and outputs display data or a display signal according to the visual content. Video outputter 13b may be a display or may include a video signal processing circuit and an output terminal for outputting a display signal to a display.

Notification device 20 includes communicator 21, controller 22, second notifier 23, and sensor 24. For example, notification device 20 is an example of the device capable of outputting a sound. Notification device 20 may be capable of outputting a video. For example, notification device 20 is lighting equipment including a speaker and a microphone. Note that notification device 20 only needs to include a speaker and a microphone, and may be a virtual private assistant (VPA) terminal, such as a smart speaker, an autonomous vacuum cleaner, a refrigerator, a washing machine, an air conditioner, or any other suitable device.

Communicator 21 receives a notification instruction from server 30 via network 60. Communicator 21 may be a communication interface (IF), for example. Communicator 21 may be a wired or wireless communication interface. Communicator 21 is connected to network 60 not necessarily via router 61 but may be connected to network 60 via a communication line, such as a mobile phone communication network.

Once communicator 21 receives a notification instruction, controller 22 causes second notifier 23 to notify of a content according to the notification instruction. If the notification instruction includes an audio content, controller 22 causes second notifier 23 to notify of the audio content by a sound. If the notification instruction includes an audio content and a visual content, controller 12 causes second notifier 23 to notify of the audio content by a sound. In this case, since second notifier 23 cannot notify of any visual content, controller 22 does not cause second notifier 23 to notify of the visual content.

If the notification instruction includes an instruction to reproduce a jingle, controller 22 may cause second notifier 23 to output a jingle. If the notification instruction includes an audio content and an instruction to reproduce a jingle, controller 22 causes second notifier 23 to output a jingle and then to notify of the audio content by a sound. Controller 22 may be a control circuit, such as a processor.

Second notifier 23 makes a notification under the control by controller 22. Second notifier 23 includes sound outputter 23a. Once controller 22 notifies of an audio content, sound outputter 23a reproduces the audio content, and outputs a sound or a sound signal according to the audio content. Sound outputter 23a may be a speaker or may include a sound signal processing circuit and an output terminal for outputting a sound signal to a speaker.

Sensor 24 senses a predetermined space in which notification device 20 is located. Sensor 24 is, for example, a microphone that detects a sound generated in the predetermined space. A result of sensing by sensor 24 is transmitted from communicator 21 via network 60 to server 30. The result of sensing includes the time of sensing. Sensor 24 senses the space periodically and repeatedly. The results of sensing obtained by the repeated sensing are periodically transmitted to server 30. If sensor 24 is a microphone, the results of sensing include sound signals generated by the microphone.

Server 30 includes communicator 31, storage 32, and controller 33. Server 30 is an example of the control device.

Communicator 31 exchanges information with notification devices 10 and 20 via network 60. Specifically, communicator 31 transmits a notification instruction to notification devices 10 and 20. Communicator 31 receives a result of sensing from notification device 20. Communicator 31 may be a wired or wireless communication interface, for example.

Storage 32 stores information indicating the addresses of notification devices 10 and 20 as the destinations of the notification instruction. Storage 32 may store a plurality of notification instructions, if the notification instruction includes a notification item in the form of sound data. Storage 32 stores the respective device information on notification devices 10 and 20 in association with the identifier of the same user. Storage 32 may store, for each of a plurality of users, the device information on one or more notification devices owned by the user. The device information may include information indicating the addresses of notification devices 10 and 20. Storage 32 may store the history of notifications to notification devices 10 and 20. In addition, storage 32 may store the results of sensing received from notification device 20.

If any of predetermined conditions is met in server 30, controller 33 causes communicator 31 to transmit a predetermined notification instruction to notification devices 10 and 20. The expression "any of predetermined conditions is met in server 30" may mean, for example, that a predetermined time has come, that predetermined information has been received, or a predetermined operation has been performed predetermined times. In other words, if one of the conditions in server 30 is met, controller 33 causes communicator 31 to transmit, to notification devices 10 and 20, a notification instruction associated with the one of the conditions.

For example, the conditions are associated with a plurality of contents. If one of the conditions is met, controller 33 selects the content associated with the condition as the content to be notified of. Controller 33 then obtains the selected content and a result of sensing notification device 20. Controller 33 obtains the content to be notified of from storage 32. Controller 33 may obtain the result of sensing from storage 32 or may request notification device 20 for the result and obtain the result via communicator 31.

Here, the result of sensing to be obtained include, for example, a result of sensing at a timing corresponding to the time at which a predetermined condition associated with the content to be notified of is met. The "timing corresponding" may be identical to the time at which the predetermined condition is met, or may be included in a time period including a certain time around (e.g., five minutes before or after) the time. The content to be notified of includes at least an audio content, out of the audio content and a visual content. Controller 33 may obtain the priority information on the priority of the content from storage 32.

The contents associated with the conditions are stored in storage 32. The contents may be each stored in association with the priority information on the priority of the content. The priority information indicates the priority. The priority may be classified into, for example, three ranks of a first rank (i.e., a high priority), a second rank (an intermediate priority), and a third rank (i.e., a low priority) in the descending order.

Note that the priority information may be used for identifying the priority. The priority information may indicate the category of a content. In this case, the category of a content may be associated with the priority, and the category information indicating the category associated with the priority may be stored in storage 32. The contents may be associated with the categories so as to be classified based on the categories. This allows controller 33 to identify the priority of a content in accordance with the category of the content.

Alternatively, the priority information may indicate the category of the condition associated with a content. In this case, the conditions associated with contents may be associated with categories. Accordingly, if one of the conditions is met, controller 33 can identify the content associated with the one of the conditions and identify the priority associated with the category associated with the one of the conditions as the priority of the identified content.

The conditions may be based on personal information, such as user information indicating the attribute of the user and preference information indicating the preference of the user. The "attribute of the user" corresponds to demographic information and includes, for example, the generation, gender, residence area, income, civil status (single/married), children (Y/N), occupation, company name, academic background, and other information on the user. The "information indicating the preference of the user" indicates the favorite genre of the user. For example, the preference of a certain user may include games, game consoles, game strategies, baseball, American football, skiing, cameras, audio devices, recorders, liquid crystal display (LCD) televisions (TVs), high definition (HD) TVs, videos, social networking service (SNS), music, coffee, cooking recipes, automobiles, automobile exterior, travel, travel bags, route maps, child rearing, interior design, and gardening.

For example, if the category of a content meeting any of the conditions is identical or similar to the attribute of the user or the preference information on the user, a higher priority may be set as the priority of the "content meeting any of the conditions". On the contrary, if the category of a content meeting any of the conditions is not identical or similar to the attribute of the user or the preference information on the user, a lower priority may be set as the priority of the "content meeting any of the conditions". The similarity is obtained as a result of comparison between the category of a content meeting any of the conditions and the attribute of the user or the preference information on the user. The higher the similarity is, the higher priority may be set as the priority of the "content meeting any of the conditions".

The conditions may be each set to have a priority of the associated content variable depending on the time period of a day. For example, if a certain condition is met in the morning, the priority of a content associated with the condition may be a first rank. On the other hand, if the certain condition is met in the afternoon, the priority of the content associated with the condition may be a second rank.

As described above, controller 33 identifies the priority based on the obtained priority information.

Controller 33 determines whether a first user ready to listen to the audio content notified of by notification devices 10 and 20 is in a predetermined space in which notification devices 10 and 20 are located, based on a result of sensing.

Specifically, controller 33 may determine whether the sound pressure of a sound generated in a predetermined space is lower than or equal to a predetermined threshold, based on a sound signal generated by the microphone. If the sound pressure of the sound generated in the predetermined space is determined to be lower than or equal to the predetermined threshold, controller 33 may determine that the first user is in the predetermined space. On the other hand, if the sound pressure of the sound generated in the predetermined space is determined to be higher than the predetermined threshold, controller 33 may determine that the first user is not in the predetermined space. In this manner, controller 33 may recognize that the first user ready to listen to an audio content notified of by notification devices 10 and 20 is in the predetermined space, if the sound pressure of the sound generated in the predetermined space is lower than or equal to the predetermined threshold.

Controller 33 then performs first control of controlling the notification of an audio content by notification devices 10 and 20 in accordance with a result of the determination. In the first control, controller 33 causes notification devices 10 and 20 to notify of an audio content, if the first user is determined to be in the predetermined space. That is, controller 33 transmits an instruction to notify of the audio content via communicator 31 to notification devices 10 and 20. Note that controller 33 does not necessarily cause both of notification devices 10 and 20 to notify of an audio content but may cause one of notification devices 10 and 20 to notify of the audio content. That is, controller 33 may transmit an instruction to notify of an audio content via communicator 31 to one of notification devices 10 and 20.

On the other hand, in the first control, controller 33 prevents notification devices 10 and 20 from notifying of any audio content, if the first user is determined not to be in the predetermined space. In this case, controller 33 may cause notification device 10 to provide a sound other than voice. Controller 33 may cause notification device 10 to emit a jingle, for example. In this case, controller 33 may cause notification device 10 to notify of, for example, a visual content included in the content to be notified of. In this case, controller 33 may cause notification device 20 to notify of an audio content included in the content to be notified of.

At first timing at which a first condition of the conditions is met, controller 33 notifies of a first content associated with the first condition. At second timing at which a second condition is met, controller 33 notifies of a second content associated with the second condition. Accordingly, if the first timing and the second timing are different, controller 33 obtains the audio contents at the different timings. In this case, controller 33 determines whether a first user ready to listen to the audio content notified of by notification devices 10 and 20 is in a predetermined space, based on a result of sensing by sensor 24 at each of the timings. Assume that controller 33 determines that the first user is in the predetermined space after determining that the first user is not in the predetermined space, based on a result of sensing at the first timing at which the first content is obtained. In this case, controller 33 may cause notification devices 10 and 20 to notifies of the first content which has not been notified of at the timing of determining that the first user is not in the predetermined space. That is, even if there is the first content that has not been notified of because the first user was not in the predetermined space, controller 33 may cause notification devices 10 and 20 to notify of the first content when detecting a change to the state where the first user is in the predetermined space.

Controller 33 may control the notification of an audio content by notification devices 10 and 20 in accordance with the identified priority. If the priority of the content to be notified of is the first rank, controller 33 may perform second control of causing notification devices 10 and 20 to notify of an audio content included in the content to be notified of. If the priority is a rank (i.e., the second rank or the third rank) lower than the first rank, controller 33 may perform the first control.

2. Operation

Now, an operation of notification system 1 will be described.

Figure 3:
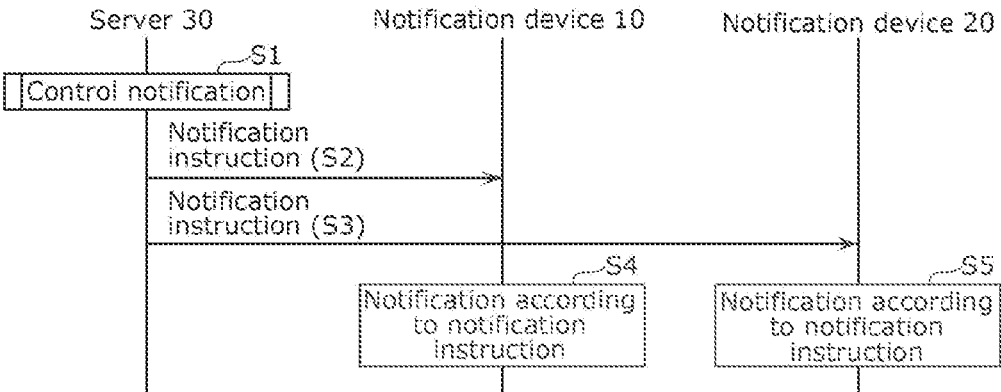
FIG. 3 is a sequence diagram showing an example operation of the notification system.

FIG. 3 is a sequence diagram showing an example operation of the notification system.

First, server 30 performs notification control (S1). The details of the notification control will be described later.

Based on the notification control, server 30 transmits a notification instruction to notification device 10 (S2) and a/the notification instruction to notification device 20 (S3).

Notification device 10 makes a notification based on the notification instruction received from server 30 (S4).

Similarly, notification device 20 makes a notification based on the notification instruction received from server 30 (S5).

The notification instruction transmitted from server 30 in step S2 may be the same as or different from the notification instruction transmitted from server 30 in step S3.

Figure 4:
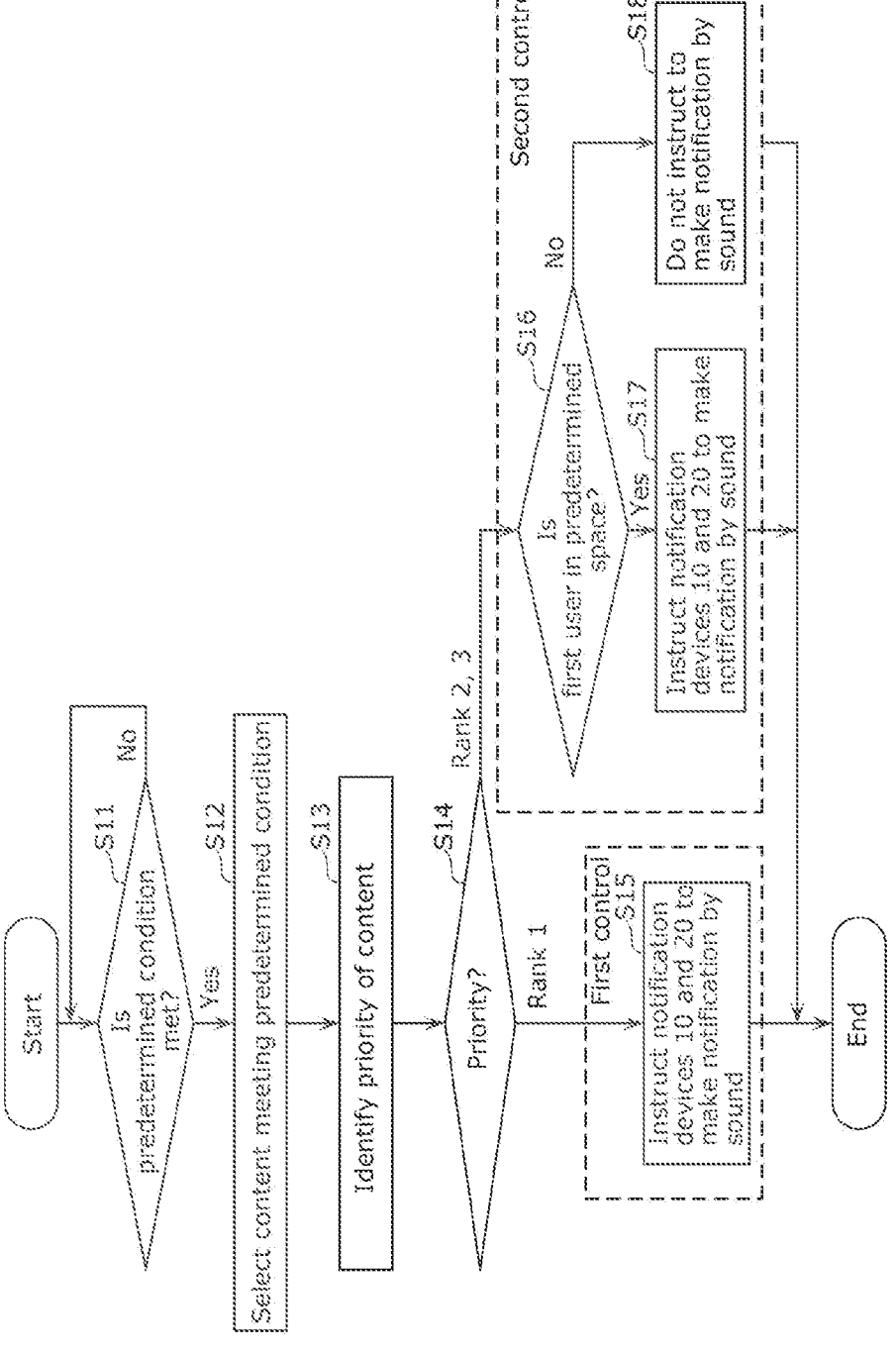
FIG. 4 is a flowchart showing example notification control in a server.

FIG. 4 is a flowchart showing example notification control in a server.

Server 30 determines whether a certain user meets predetermined conditions (S11).

If the user is determined to meet the predetermined conditions (Yes in S11), server 30 executes step S12. If the user is determined to meet none of the predetermined conditions (No in S11), the process returns to step S11.

In step S12, server 30 selects the content meeting predetermined conditions (S12).

Next, based on the selected content, server 30 identifies the priority of the content (S13).

Next, server 30 determines which one of ranks 1, 2, and 3 the priority is (S14).

Server 30 executes step S15, if the priority is rank 1 (i.e., "Rank 1" in S14); and step S16, if the priority is rank 2 or rank 3 (i.e., "Rank 2" or "Rank 3" in S15).

In step S15, server 30 instructs notification devices 10 and 20 to make a notification by a sound (S15). Specifically, server 30 transmits, to notification device 10, an instruction to reproduce a jingle and an instruction to make a notification including the notification of an audio content and a visual content. In addition, server 30 transmits, to notification device 20, an instruction to reproduce a jingle and an instruction to make a notification including the notification of the audio content.

In step S16, server 30 determines whether a first user ready to listen to the audio content notified of by notification devices 10 and 20 is in a predetermined space (S16).

If the first user is in the predetermined space (Yes in S16), server 30 executes step S17. On the other hand, if the first user is not in the predetermined space (No in S16), server 30 executes step S18.

In step S17, server 30 instructs notification devices 10 and 20 to make a notification by a sound (S17). Specifically, server 30 transmits, to notification device 10, an instruction to reproduce a jingle and an instruction to make a notification including the notification of an audio content and a visual content. In addition, server 30 transmits, to notification device 20, an instruction to reproduce a jingle and an instruction to make a notification including the notification of the audio content.

In step S18, server 30 does not instruct notification devices 10 and 20 to make a notification by a sound (S18).

In step S18, server 30 may instruct notification device 10 to make a notification including the notification of a visual content. In step S18, server 30 may transmit, to notification devices 10 and 20, a notification instruction including an instruction to reproduce a jingle.

In this manner, server 30 determines whether to notify of an audio content, depending on whether a first user ready to listen to the audio content notified of by notification devices 10 and 20 is in the predetermined space, based on a result of sensing. Server 30 then notifies of the audio content based on a result of the determination.

3. Advantages

Notification system 1 according this embodiment includes an obtainer (controller 33) and controller 33. The obtainer obtains an audio content to be notified of and a result of sensing by sensor 24 that senses a space in which the notification device is located. Controller 33 performs first control of controlling the notification of an audio content by notification devices 10 and 20, depending on whether a first user ready to listen to the audio content notified of by notification devices 10 and 20 is in a predetermined space, based on the result of sensing by sensor 24. In the first control, controller 33: causes notification devices 10 and 20 to notify of the audio content, when the first user is in the predetermined space; and prevents notification devices 10 and 20 from notifying of the audio content, when the first user is not in the predetermined space.

With this configuration, if the first user ready to listen to an audio content is in the predetermined space, an audio content is notified of and is thus easily recognized by the first user. Accordingly, the first user easily recognizes the notification of the audio content. On the other hand, if the first user ready to listen to an audio content is not in the predetermined space, no audio content is notified of. This reduces the notification of an audio content less likely to be recognized and eventually reduces the power consumption.

In notification system 1 according this embodiment, sensor 24 is a microphone that detects a sound generated in the predetermined space. Controller 33 determines that the first user is in the space, if the sound pressure of the sound generated in the space is determined to be lower than or equal to a predetermined threshold, based on a sound signal generated by the microphone. Controller 33 determines that the first user is not in the space, if the sound pressure of the sound generated in the space is determined to be higher than the predetermined threshold, based on the sound signal.

With this configuration, if the sound pressure of the sound generated in the predetermined space in which notification devices 10 and 20 are located is lower than or equal to the predetermined threshold (i.e., there is no noise sufficiently loud to interrupt the notification by a sound in the predetermined space). In this case, an audio content is notified of and is thus easily recognized by the first user. Accordingly, the user can be effectively notified of an audio content. On the other hand, assume that the sound pressure of the sound generated in the space in which notification devices 10 and 20 are located is higher than the predetermined threshold (i.e., there is a noise sufficiently loud to interrupt the notification by a sound in the predetermined space). In this case, no audio content is notified of. This reduces the notification of an audio content less likely to be recognized and eventually reduces the power consumption.

In notification system 1 according this embodiment, the obtainer (i.e., controller 33) obtains a plurality of audio contents at a plurality of timings that are different from each other. Controller 33 determines whether the first user is in the space, based on a result of sensing by sensor 24 at each of the plurality of times. Controller 33 causes notification devices 10 and 20 to notify of a first audio content that has not been notified of at timing of determining that the first user is not in the space, when determining that the first user is in the space even after determining that the first user is not in the space, based on a result of sensing at first timing at which the first audio content is obtained.

Accordingly, the first audio content, which could not have been notified of, is notified of when it becomes ready. This reduces the failure of the user in recognizing the first audio content.

In notification system 1 according this embodiment, the obtainer (i.e., controller 33) further obtains priority information on priority of the audio content. Controller 33 performs second control of causing notification devices 10 and 20 to notify of the audio content, when the priority is a first rank. Controller 33 performs the first control, when the priority is a second rank that is lower than the first rank.

Accordingly, the user can be immediately notified of an audio content with a higher priority.

4. Variation (1) In notification system 1 according the embodiment described above, a microphone has been raised as an example of sensor 24. The sensor is not limited thereto and may be a camera or a motion sensor, for example.

If sensor 24 is a camera, the camera is included in notification device 20 to capture a predetermined space. Controller 33 determines whether a person is in the predetermined space, based on one or more images captured by the camera. Controller 33 may determine whether the person is in the predetermined space, for example, by executing image recognition processing on the one or more images. Note that the one or more images may include still images captured at different timings, or may include the frames of a moving image. If sensor 24 is a motion sensor, the motion sensor is included in notification device 20 and includes the predetermined space in a detection range. Controller 33 determines whether a person is in the predetermined space, based on a result of detection by the motion sensor. In this manner, controller 33 may determine that a first user ready to listen to the audio content notified of by notification devices 10 and 20 is in the predetermined space, if any person is determined to be in the predetermined space. On the other hand, controller 33 may determine that the first user is not in the predetermined space, if no person is determined to be in the predetermined space.

With this configuration, if the first user ready to listen to an audio content is in the predetermined space, an audio content is notified of and is thus easily recognized by the first user. Accordingly, the first user easily recognizes the notification of the audio content. On the other hand, if the first user ready to listen to an audio content is not in the predetermined space, no audio content is notified of. This reduces the notification of an audio content less likely to be recognized and eventually reduces the power consumption.

(2) In notification system 1 according to Variation (1), controller 33 determines whether the first user is in the predetermined space depending on whether any person is in the predetermined space, based on one or more images captured by the camera or a result of detection by the motion sensor. The determination is not limited thereto. Controller 33 may determine whether a person in the predetermined space perform a predetermined behavior, based on at least one of a sound signal generated by the microphone or the one or more images captured by the camera. Based on a result of the determination, controller 33 may determine whether the first user ready to listen to an audio content notified of by notification devices 10 and 20 is in the predetermined space. Controller 33 may determine whether a person in the predetermined space perform the predetermined behavior, for example, by executing sound recognition processing on a sound signal. Alternatively, controller 33 may determine whether a person in the predetermined space performs the predetermined behavior by executing image recognition processing on one or more images. Alternatively, controller 33 may determine whether a person in the predetermined space perform the predetermined behavior by executing both the sound recognition processing and the image recognition processing.

If a person in the predetermined space is determined to perform a predetermined behavior, based on at least one of the sound signal or the one or more images, controller 33 determines that the first user is in the predetermined space. On the other hand, if the person in the predetermined space is determined not to perform the predetermined behavior, controller 33 determines that the first user is not in the predetermined space, based on at least one of the sound signal or the one or more images. The predetermined behavior may be other than viewing a video content on notification device 10, for example, or other than viewing a video content or an audio content on another device. The predetermined behavior may be viewing predetermined one of video contents or predetermined one of audio contents. The predetermined one of the video contents or the predetermined one of the audio contents is, for example, an advertising video content or an advertising audio content. The predetermined video content or the predetermined audio content may be, for example, of a genre different from the genre in which the user in the predetermined space is interested in. In this case, the person in the predetermined space may be identified based on the user ID associated with a mobile terminal, such as a smartphone, connected to router 61. The predetermined behavior may be a conversation among people or a conversation using phones or information terminals.

With this configuration, if the person in a predetermined space does not perform the predetermined behavior, an audio content is notified of and is thus easily recognized by the first user. Accordingly, the user can be effectively notified of an audio content. On the other hand, a person in the predetermined space performs a predetermined behavior, no audio content is notified of. This reduces the notification of an audio content less likely to be recognized and eventually reduces the power consumption.

(3) In the embodiment and its variation described above, sensor 24 is included in notification device 20. The location is not limited thereto. Sensor 24 may be included in a device other than notification device 20. If including sensor 24, the other device is communicative with server 30 and can transmit a result of sensing by sensor 24 via network 60.

(4) In notification system 1 according the embodiment described above, controller 33 selects a content to be notified of, out of a plurality of contents. The configuration is not limited thereto. If one of the conditions is met, the content to be notified of may be generated under a rule associated with the one of the conditions in advance.

(5) In notification system 1 according the embodiment described above, notification device 10 reproduces an audio content or a visual content, if included in the notification instruction. The content is not limited thereto. For example, the notification instruction may always include an audio content and a visual content, and further include information indicating whether to notify of an audio content and information indicating whether to notify of a visual content. In this manner, notification device 10 may switchably notify of the audio content and the visual content included in the notification instruction, based on the information indicating whether to notify of the audio content and the information indicating whether to notify of the visual content.

5. Others

In the embodiment described above, each element may be achieved by dedicated hardware or by executing a software program suitable for the element. Each element may be achieved by a program executor, such as a central processing unit (CPU) or a processor, reading and executing a software program recorded in a recording medium, such as a hard disk drive (HDD) or a semiconductor memory. Here, the software for operating the system, the information terminal, the server, the camera equipment, or other elements in the embodiment described above is a program that causes a computer to execute the steps included in the flowcharts shown in the drawings.

Note that the present disclosure also includes the following cases.

(1) Specifically, the devices described above are each a computer system including a microprocessor, a read-only memory (ROM), a random-access memory (RAM), a hard disk unit, a display unit, a keyboard, a mouse, or other components. The RAM or the hard disk unit includes computer programs. The microprocessor operates in accordance with the computer programs so that the devices fulfill their functions. The computer programs are each obtained by combining a plurality of command codes indicating instructions to the computer to fulfill predetermined functions.

(2) Some or all of the components of the devices described above may be a single system large-scale integrated (LSI) circuit. The system LSI circuit is a super multifunctional LSI circuit manufactured by integrating a plurality of components on a single chip, and specifically is a computer system including a microprocessor, a ROM, a RAM, and other suitable components. The RAM stores computer programs. The microprocessor operates in accordance with the computer programs so that the system LSI circuit fulfills its functions.

(3) Some or all of the components of the devices described above are each an IC card or a single module attachable to and detachable from the devices. The IC card or the module is a computer system including a microprocessor, a ROM, a RAM, and other suitable components. The IC card or the module may include the super LSI circuit described above. The microprocessor operates in accordance with a computer program so that the IC card or the module fulfills its functions. This IC card or this module may have a resistance to tamper.

(4) The present disclosure may be directed to the method described above. Alternatively, the present disclosure may be directed to a computer program causing a computer to execute the method, or a digital signal indicating the computer program.

The present disclosure may be directed to the computer program or the digital signal recorded on a computer-readable recording medium, such as a flexible disk, a hard disk, a CD-ROM, a magneto-optical (MO) disk, a DVD, a DVD-ROM, a DVD-RAM, a Blu-ray (registered trademark) disk (BD), or a semiconductor memory. Alternatively, the present disclosure may be directed to a digital signal recorded in the recording medium.

The present disclosure may be directed to the computer program or the digital signal transmitted via a telecommunication line, a wired or wireless communication line, a network represented by the Internet, data broadcasting, or any other suitable means.

The present disclosure may be directed to a computer system including a microprocessor and a memory. The memory may store the computer program described above. The microprocessor may operate in accordance with the computer program described above.

The present disclosure may be directed to another independent computer system that records the program or the digital signal in the recording medium and transfers the recorded program or digital signal, or transfers the program or the digital signal via the network or any other suitable means.

(5) The embodiment and variation described above may be combined.

INDUSTRIAL APPLICABILITY

The present disclosure is useful as a notification system capable of effectively notifying the user of an audio content.

The invention claimed is:

1. A notification system comprising:
an obtainer that obtains an audio content to be notified of and a result of sensing obtained by a microphone that detects a sound generated in a space in which a notification device is located; and
a controller that performs first control of controlling notification of the audio content by the notification device depending on whether a sound pressure of the sound generated in the space is lower than or equal to a predetermined threshold, based on a sound signal generated by the microphone as the result of the sensing, wherein
in the first control, the controller:
causes the notification device to notify of the audio content, when the sound pressure is lower than or equal to the predetermined threshold; and
prevents the notification device from notifying of the audio content, when the sound pressure is higher than the predetermined threshold,
the obtainer obtains a plurality of audio contents at a plurality of timings that are different from each other, and
the controller:
determines, for each of the plurality of timings, whether a sound pressure of the sound generated in the space is lower than or equal to the predetermined threshold, based on a sound signal generated by the microphone at the timing; and
causes the notification device to notify of a first audio content that has not been notified of at a timing at which the sound pressure is determined to be higher than the predetermined threshold, when (i) determining that the sound pressure is lower than or equal to the predetermined threshold after determining that the sound pressure is higher than the predetermined threshold, based on a sound signal at a first timing at which the first audio content is obtained and (ii) no portion of the first audio content is notified to the notification device at the first timing.

2. The notification system according to claim 1, wherein the obtainer further obtains priority information on priority of the audio content, and the controller performs:

second control of causing the notification device to notify of the audio content, when the priority is a first rank; and the first control, when the priority is a second rank that is lower than the first rank.

3. A notification method comprising:

obtaining an audio content to be notified of and a result of sensing obtained by a microphone that detects a sound generated in a space in which a notification device is located;

determining whether to notify of the audio content depending on whether a sound pressure of the sound generated in the space is lower than or equal to a predetermined threshold, based on a sound signal generated by the microphone as the result of the sensing; and notifying of the audio content based on a result of the determining, wherein the determining includes:

determining to notify of the audio content, when the sound pressure is lower than or equal to the predetermined threshold; and determining not to notify of the audio content, when the sound pressure is higher than the predetermined threshold, in the obtaining the audio content, a plurality of audio contents are obtained at a plurality of timings that are different from each other, and the method comprises:

determining, for each of the plurality of timings, whether a sound pressure of the sound generated in the space is lower than or equal to the predetermined threshold, based on a sound signal generated by the microphone at the timing; and causing the notification device to notify of a first audio content that has not been notified of at a timing at which the sound pressure is determined to be higher than the predetermined threshold, when (i) determining that the sound pressure is lower than or equal to the predetermined threshold after determining that the sound pressure is higher than the predetermined threshold, based on a sound signal at a first timing at which the first audio content is obtained and (ii) no portion of the first audio content is notified to the notification device at the first timing.

4. A non-transitory computer-readable recording medium having recorded thereon a program for causing a computer to execute the notification method according to claim 3.

5. A control device communicably connected to a notification device, the control device comprising:

an obtainer that obtains an audio content to be notified of and a result of sensing obtained by a microphone that detects a sound generated in a space in which a notification device is located; and a controller that performs first control of controlling notification of the audio content by the notification device depending on whether a sound pressure of the sound generated in the space is lower than or equal to a predetermined threshold, based on a sound signal generated by the microphone as the result of the sensing, wherein in the first control, the controller:

causes the notification device to notify of the audio content, when the sound pressure is lower than or equal to the predetermined threshold; and prevents the notification device from notifying of the audio content, when the sound pressure is higher than the predetermined threshold, the obtainer obtains a plurality of audio contents at a plurality of timings that are different from each other, and the controller:

determines, for each of the plurality of timings, whether a sound pressure of the sound generated in the space is lower than or equal to the predetermined threshold, based on a sound signal generated by the microphone at the timing; and causes the notification device to notify of a first audio content that has not been notified of at a timing at which the sound pressure is determined to be higher than the predetermined threshold, when (i) determining that the sound pressure is lower than or equal to the predetermined threshold after determining that the sound pressure is higher than the predetermined threshold, based on a sound signal at a first timing at which the first audio content is obtained and (ii) no portion of the first audio content is notified to the notification device at the first timing.

* * * * *